United States Patent [19]
Nelson

[11] Patent Number: 5,983,552
[45] Date of Patent: Nov. 16, 1999

[54] ANIMAL FIGURE

[75] Inventor: Ronald D. Nelson, Sidney, Nebr.

[73] Assignee: Cabela's Inc., Sidney, Nebr.

[21] Appl. No.: 08/942,628

[22] Filed: Oct. 2, 1997

[51] Int. Cl.⁶ .............................................. A01M 31/06
[52] U.S. Cl. .................................................. 43/2
[58] Field of Search ...................... 43/1–3; 446/369, 446/391

[56] References Cited

U.S. PATENT DOCUMENTS

| | | | |
|---|---|---|---|
| 547,033 | 10/1895 | Ross | 43/3 |
| 747,732 | 12/1903 | Kremer | 43/3 |
| 1,023,401 | 4/1912 | Trowbridge | 446/369 |
| 1,673,759 | 6/1928 | Smith | 446/369 |
| 1,697,465 | 1/1929 | Kempf | 43/3 |
| 1,933,844 | 11/1933 | Davis | 43/3 |
| 2,274,246 | 2/1942 | Riddell | 43/3 |
| 2,309,447 | 1/1943 | Greneker | 428/16 |
| 2,495,720 | 1/1950 | Heymann | 43/3 |
| 2,651,873 | 9/1953 | Risch et al. | 43/3 |
| 2,706,357 | 4/1955 | Nigh et al. | 43/3 |
| 2,719,376 | 10/1955 | Risch | 43/3 |
| 2,816,384 | 12/1957 | Rexius | 43/3 |
| 3,478,459 | 11/1969 | Gazalski | 43/3 |
| 3,509,656 | 5/1970 | Woolworth | 43/3 |
| 3,528,189 | 9/1970 | Lilley, Jr. | 43/42.33 |
| 3,704,538 | 12/1972 | Gagnon | 43/3 |
| 3,707,798 | 1/1973 | Tryon | 43/3 |
| 4,611,421 | 9/1986 | Jacob | 43/3 |
| 4,658,530 | 4/1987 | Ladehoff | 43/3 |
| 4,689,913 | 9/1987 | Brice | 43/3 |
| 4,691,464 | 9/1987 | Rudolph | 43/3 |
| 4,773,178 | 9/1988 | Marek | 43/2 |
| 4,821,444 | 4/1989 | Remus | 43/2 |
| 4,829,695 | 5/1989 | Hoecherl | 43/3 |
| 4,885,861 | 12/1989 | Gazalski | 43/3 |
| 4,890,408 | 1/1990 | Heiges et al. | 43/3 |
| 4,929,213 | 5/1990 | Morgan | 446/369 |
| 5,009,626 | 4/1991 | Katz | 446/391 |
| 5,098,050 | 3/1992 | Bruns et al. | 43/3 |
| 5,205,060 | 4/1993 | Franceschini | 43/3 |
| 5,279,063 | 1/1994 | Heiges | 43/3 |
| 5,293,709 | 3/1994 | Cripe | 43/3 |
| 5,570,531 | 11/1996 | Sroka | 43/3 |
| 5,572,824 | 11/1996 | Szolis | 43/3 |
| 5,613,317 | 3/1997 | Ninegar | 43/3 |

*Primary Examiner*—Michael J. Carone
*Assistant Examiner*—Darren Ark
*Attorney, Agent, or Firm*—Bachman & LaPointe, P.C.

[57] ABSTRACT

The present invention relates to an animal figure that has utility as a hunting decoy, a lawn ornament, a crop protection device, a museum display piece, and a theatrical prop. The animal figure has a body portion, a head portion attached to the body portion, feet and legs attached to the body portion, and a support frame attached to the feet. The animal figure has a skin over the head and body portions, which skin has a photograph of the animal printed thereon. The animal figure of the present invention may be easily assembled and disassembled for storage and transport. A method for producing the animal figure is also disclosed.

30 Claims, 6 Drawing Sheets

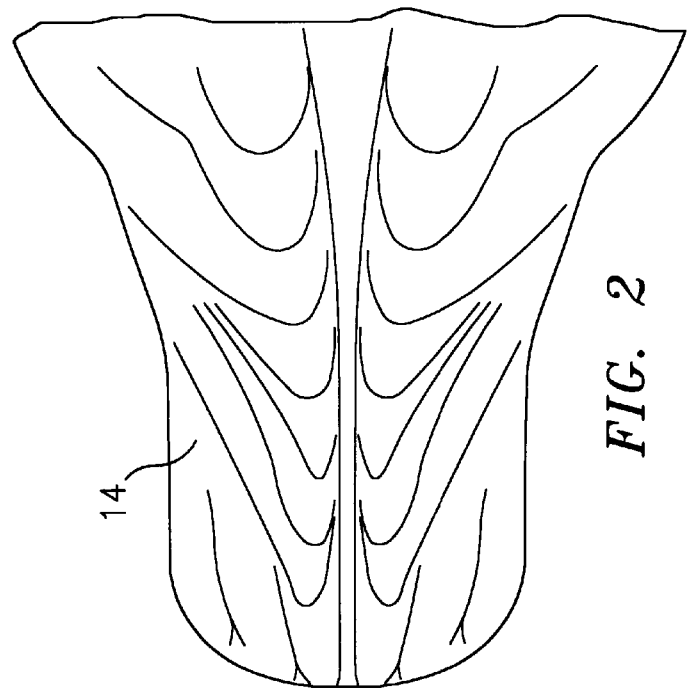
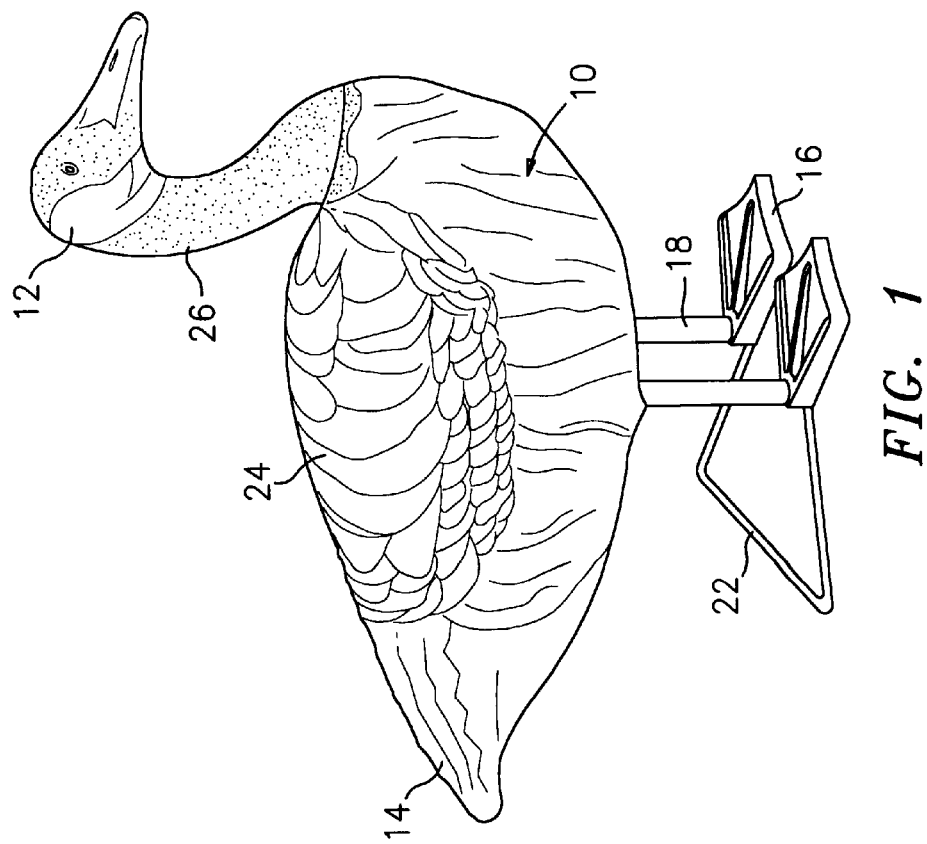

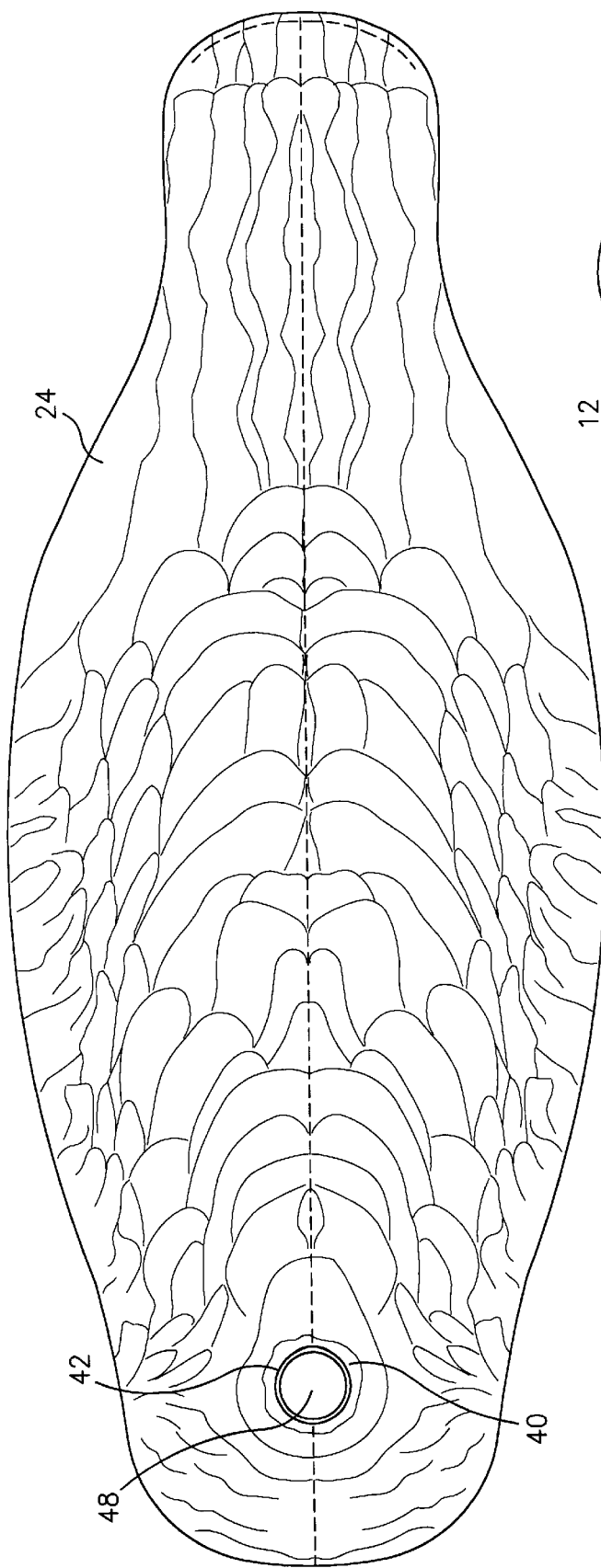
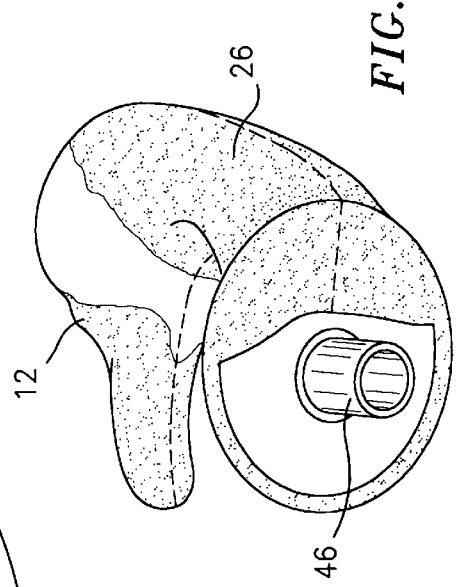
FIG. 6
FIG. 7

ANIMAL FIGURE

BACKGROUND OF THE INVENTION

The present invention relates to animal figures which have primary utility as hunting decoys, but also have other utilities such as lawn ornaments, museum display devices, crop protection devices, and theatrical props.

Animal decoys have long been used by hunters to attract game such as waterfowl, game birds, deer, and other animals. The decoys are used to draw the game within the hunter's shooting range. Some decoys are placed within a body of water, while others are arranged on land. The shape of the decoy is used to attract any overflying birds or land animals. Obviously, the more life-like a decoy looks, the more likely it is to attract game.

Such decoys are also used by bird watchers to attract birds for observation. Still further, such decoys have utility in crop protection schemes where they serve to frighten away scavenging animals. Life-like decoys also have been used in museums as part of animal displays and have been used simply as lawn and garden ornamentation.

The patent literature is replete with decoy designs. U.S. Pat. No. 2,706,357 to Nigh et al., for example, illustrates a duck decoy which can be disassembled for storage purposes. The decoy comprises a frame formed by two longitudinally extending ribs and a plurality of interlocking transverse ribs and a preformed skin or cover that fits over the frame. The skin or cover is formed by two pieces, each having the contour of the head and the body of a duck. The two cover pieces are joined together by slide fasteners, adhesive tape, leak-sealing compound, or waterproof adhesive. Features such as the duck's eyes and the wings are painted onto the cover.

U.S. Pat. No. 3,707,798 to Tryon illustrates a goose decoy of the silhouette type formed by a flat body portion and a flat wing portion, both of which are covered by color photographs of a goose. An elongated member, such as a stake, connected to the body portion is used to position the decoy in a desired position. The principal deficiency of this type of decoy is that it is not life-like.

U.S. Pat. No. 4,691,464 to Rudolph relates to a flexible fabric covering for avian decoys for enhancing the life-like accuracy of the decoy. Markings are illustrated on the exterior of the covering and represent the surface features of a wildfowl. The markings may be created by techniques such as hand painting, printing or silk-screening. A reflective iridescent panel is attached to the covering at substantially the location of a duck's secondary feathers to mimic the iridescence of the secondary feathers. The covering is removably secured to the decoy by a drawstring or elastic band so as to reduce damage to the cover during transport of the decoy.

U.S. Pat. No. 4,611,421 to Jacob relates to a windsock type of decoy. The Jacob decoy has a head portion and a neck portion made of relatively rigid material, which head and neck portions are formed to simulate the head and neck of a waterfowl. A body portion includes a flexible bag of wind sock construction having an opening which is maintained in an open condition by a hoop member. A hoop support is provided for supporting the hoop member for rotation about a generally vertical axis of rotation generally coincident with a diameter of the hoop. The hoop support includes a strip of resilient material extending from the support into the bag and terminating at a free end adjacent the tail. The free end is centrally located on a spreader at the tail of the bag. The spreader maintains the strip centrally along an upper panel of the flexible bag. The head and body portion are also connected to the support member for rotation therewith. U.S. Pat. No. 5,172,506 to Tiley et al. illustrates a similar windsock type of decoy.

U.S. Pat. No. 4,689,913 to Brice relates to a collapsible decoy made up of a collapsible frame with a flexible covering. The frame includes a first large wire arch with a wire tail and an attached head configuration and a second wire arch. A pivot connects the large arch with the second arch so that the two can be rotated to be essentially one on top of the other in a flat position and then rotated 90° to an expanded position. An anchoring pole is fixed to the large arch so that the decoy can be supported from the ground. U.S. Pat. No. 5,595,012 to Coleman illustrates a similar wire frame type of decoy.

U.S. Pat. No. 4,890,408 to Heiges et al. relates to a waterfowl decoy comprising a solid molded body having a layer of burlap-like material adhesively secured to its outer surface. The fabric covering is coated with the adhesive. A shaped head is affixed to the body, and the coated fabric is painted to resemble a selected waterfowl species. A keel including means for securing and retaining an anchor line is provided on the bottom of the body. The keel includes a recess adapted for retaining a deployed anchor line. The fabric covering used on the commercial embodiment of this decoy is a hard nonremovable burlap cover intended to protect the foam body and to make it easier to paint.

U.S. Pat. No. 5,572,824 to Szolis illustrates a wildlife decoy having a form which includes a head section and a tail section, at least one longitudinal support coupled to the head and tail sections, a plurality of circumferential ribs attached to the longitudinal support(s), and a skin attached to the decoy form so as to overlay at least a portion of each of the supports and ribs.

Despite the existence of these decoys, there remains a need for a life-like, three-dimensional decoy which can attract birds such as geese, ducks, and other game birds and which, when in the form of a land animal, can attract other land animals.

SUMMARY OF THE INVENTION

Accordingly, it is an object of the present invention to provide a life-like, three-dimensional animal figure.

It is a further object of the present invention to provide an animal figure as above which can be easily assembled and disassembled.

It is yet a further object of the present invention to provide an animal figure as above which has a variety of uses.

It is still another object of the present invention to provide a method for assembling the animal figure of the present invention.

The foregoing objects are attained by the animal figure and the assembly method of the present invention.

In accordance with the present invention, an animal figure comprises a body in the shape of an animal and a skin formed from a fabric material placed over the body. The fabric material has a photograph of the animal printed thereon. The photograph is screen printed on or applied using an electric heat transfer technique to said fabric material. The photograph is preferably a computer enhanced blend of a plurality of photographs. The fabric material is placed over and removably secured to the frame. In a preferred embodiment of the present invention, the fabric material comprises a stretch fabric material.

The animal figure preferably has a pair of feet attached to the frame and means for supporting the figure in an upright position. The supporting means comprises a wire frame attached to the feet.

The method for assembling or producing the animal figure of the present invention broadly comprises the steps of providing a body in the shape of an animal, printing a photograph of the animal on a fabric material, and positioning the fabric material with the printed photograph thereon over the body.

The animal figures of the present invention may be used as hunting decoys, lawn ornaments, crop protection devices, museum display devices and theatrical props. They are easy to assemble and disassemble. Further, when used as bird figures, different coverings can be used to depict different type of birds.

While the present invention will be described in the form of a bird figure, it should be recognized that it also could be a land animal figure such as a deer.

Still other objects, advantages, and details of the present invention will be set forth in the following description wherein like reference numerals depict like elements.

BRIEF DESCRIPTION OF THE DRAWINGS

FIG. 1 is a perspective view of an animal figure in accordance with the present invention;

FIG. 2 is a top view of a rear portion of the body portion of the animal figure of FIG. 1;

FIG. 6 is a top view of the animal figure of the present invention showing the skin fitted over the body portion of the animal figure;

FIG. 7 is a perspective view of the head of the animal figure; and

DETAILED DESCRIPTION OF THE PREFERRED EMBODIMENT(S)

Figure 3:
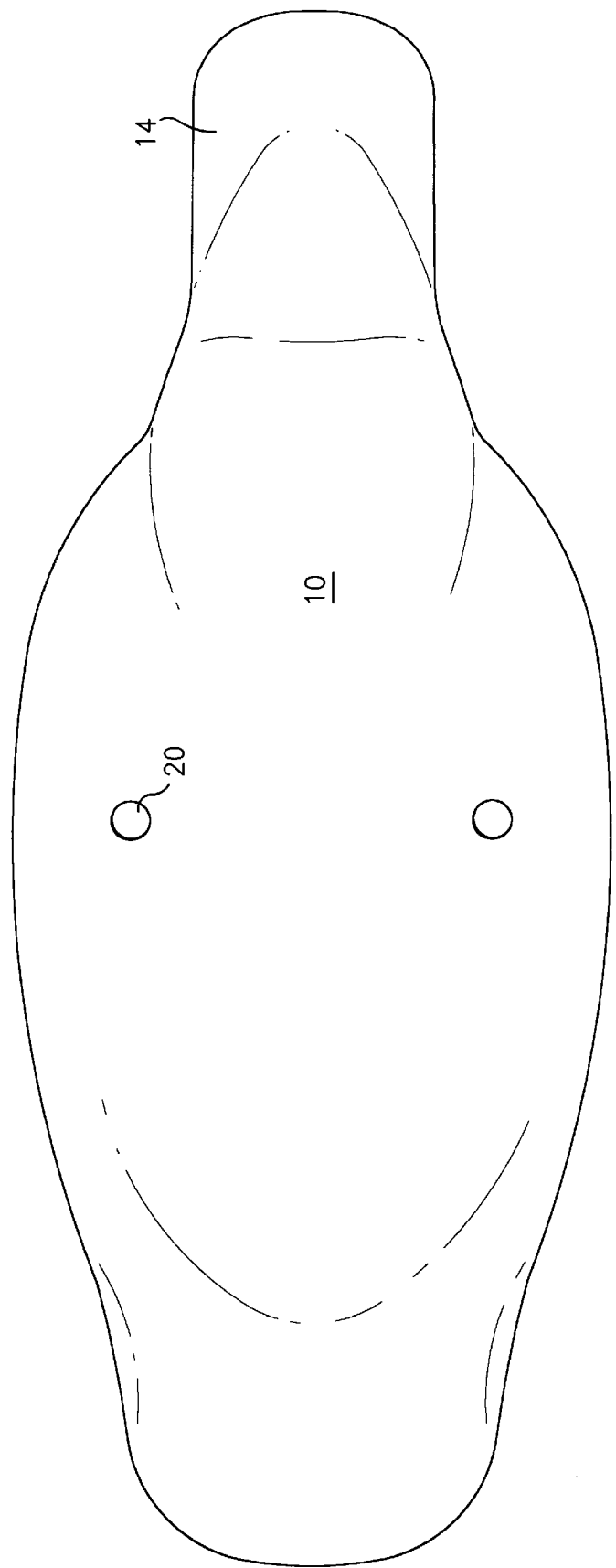
FIG. 3 is a bottom view of the body portion of the animal figure of FIG. 1.

Referring now to the drawings, FIG. 1 illustrates the body portion 10 of an animal figure in accordance with the present invention. As shown therein, the body portion 10 is three-dimensional in shape and may be hollow, solid or inflatable. The body portion 10 may be formed from any suitable material known in the art. For example, the body portion 10 may be formed from a rigid, solid foam material such as polyurethane or styrene. Alternatively, the body portion 10 could be a taxidermy form. As can be seen from FIG. 2, the tail portion 14 of the body may be sculpted to simulate the tail feathers of a bird.

As shown in FIG. 1, the animal figure has a head portion 12. The head portion 12 is preferably formed from the same material as the body portion 10 and is shaped to resemble a desired animal. It too may be hollow, solid or inflatable. Preferably, the head portion 12 is detachable to allow easier storage of the animal figure and to facilitate assembly of the animal figure. Any suitable means known in the art such as a post and stub column arrangement can be used to join the head portion 12 to the body portion 10.

The animal figure, when used on land, preferably has a pair of feet 16 joined to the body. The feet 16 may be joined to the body in any desired manner. For example, as shown in FIG. 1, each foot 16 may include a leg portion 18 joined thereto. The bottom of the body portion 10 may have two slots 20 for receiving the free ends of the leg portions 18. Each of the slots 20 preferably extends into the body portion 10 and is sized so as to retain a leg portion 18 in place using friction and to allow easy removal of the leg portion 18 from the slot 20 when the animal figure is to be disassembled.

The feet 16 and the leg portions 18 may be formed from the same material or from different materials. For example, both can be formed from a plastic material. Alternatively, the feet can be formed from a plastic material, while the legs are formed from a metal material. Further, each foot 16 may be joined to a respective one of the leg portions 18 by any suitable means known in the art. For example, each foot 16 may be joined to a leg portion 18 by an adhesive. Alternatively, each foot 16 may be integrally formed with a leg portion 18. Preferably, the feet 16 and the leg portions 18 are painted a color which replicates the color of the real animal's feet. If desired, the feet 16 may be molded to have a sculptured life-like appearance.

To insure that the feet 16 are capable of supporting the animal figure, a frame 22 may be attached to each foot. The frame 22 may be formed from steel wire or rod. Alternatively, the frame 22 may be formed from molded plastic or a suitable metallic material other than steel.

Figure 4:
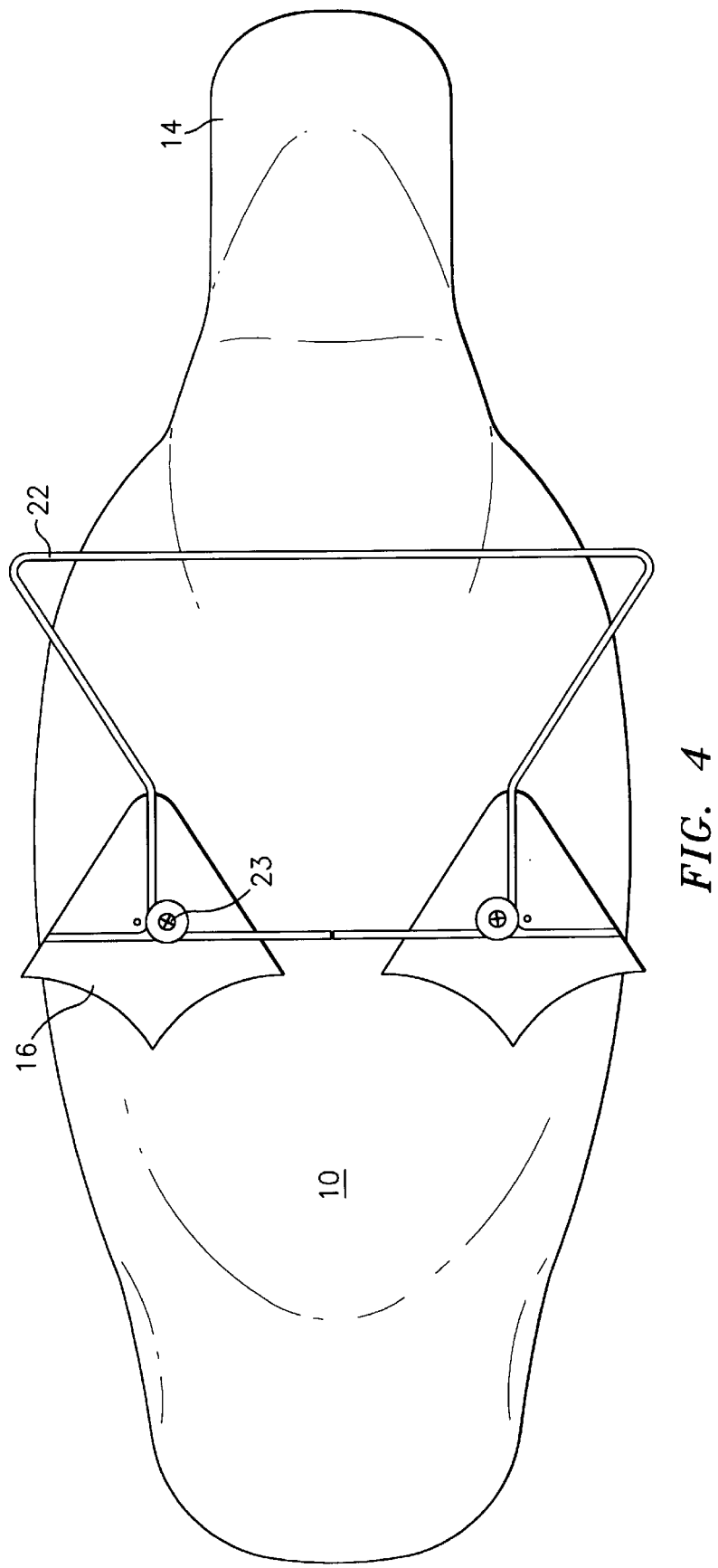
FIG. 4 is a bottom view of the animal figure of FIG. 1 showing the support frame attached to the feet of the animal figure.

Any suitable means known in the art may be used to join the frame 22 to the feet 16. For example, free ends of the frame 22 may be inserted into slots (not shown) in the back of the feet. Alternatively, as shown in FIG. 4, the frame 22 may be attached to the bottom side of the feet 16 by screws 23 or similar types of fasteners.

The steel rod or wire frame 22 may have any desired shape and extent. It is important however that the frame 22 be of sufficient size to help support the animal figure, yet be small enough that it will not be noticed by an animal such as a bird flying overhead.

If desired, the legs 18, the feet 16 and the frame 22 may be molded, either from plastic or metal, as a single unit.

When creating an animal figure such as that of the present invention, it is important the figure look as real to life as possible. This is particularly important when the figure is to be used as a hunting decoy. The more real to life the figure looks, the more the likelihood of drawing the animal in close to the hunter. To this end, a man made skin 24 is placed over the body portion 10 and a separate man made skin 26 is placed over the head portion 12.

The skin 24 may be formed from any suitable durable fabric known in the art. For example, the skin may be formed from a tough stretch fabric, such as a stretch polyester fabric material. A stretch fabric is preferred so as to substantially avoid wrinkles when the skin is placed over the body portion 10.

The fabric forming the skin 24 has printed on it a photograph of the animal that matches the shape of the body portion 10. The photograph is a computer enhanced image which shows all of the details of the animal. The image is generated by taking multiple photographs of the animal and blending them together to make a two-dimensional photograph of a three-dimensional animal. The specific techniques for computer enhancing the image and for blending the photographs together do not form part of the present invention. Any suitable techniques known in the art may be used.

The photograph generated by the computer may be printed onto the fabric using any suitable technique known in the art. For example, the photograph may be printed onto the fabric using a screen printing technique in either black or white or in four color. Alternatively, the photograph may be printed onto the fabric using an electric heat transfer technique.

Figure 5:
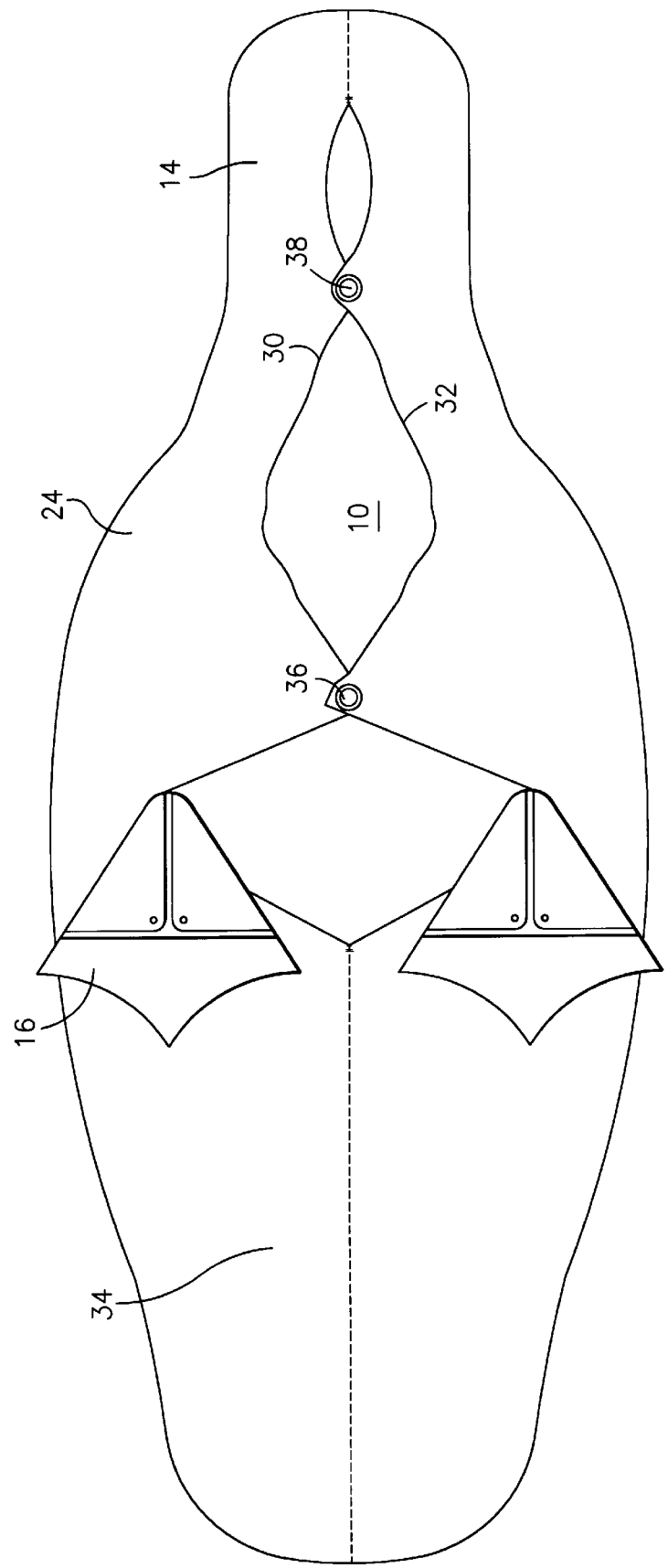
FIG. 5 is a bottom view of the body portion of the animal figure of FIG. 1 showing the skin stretched over the body portion.

The skin 24, as shown in FIG. 5, has a central opening 28 which allows it to be placed over the body portion 10. The opening 28 is defined by edges 30 and 32 which are sewn together at their ends. As can be seen from FIG. 5, the opening 28 extends less than the length of the body portion 10. By providing such an arrangement, it is possible to fit the skin 24 tautly over a chest portion 34 of the body portion 10 and over the tail portion 14. In fact, as shown in FIG. 5, the skin 24 forms a pouch which fits over the tail portion.

The opening 28 may be closed in any suitable manner known in the art. For example, the edges 30 and 32 may have a zipper sewn thereto. If a zipper is used as the closing device, sufficient material must be provided to allow the two mating portions of the zipper to be joined together. Alternatively, the edges 30 and 32 may be provided with snap connectors 36 and 38, respectively, to permit the skin to be secured to the body portion 10. Each snap connector 36 and 38 may include a fastening device along edge 30 and a mating fastening device along edge 32. It is also possible to use a draw string (not shown) or an elastic band incorporated within the edges 30 and 32 instead. The provision of one of the aforementioned closure devices allows the skin to be easily removed for storage and/or washing. Further, it allows, in the case of birds, to use the same body portion for more than one species of bird. For example, the same body portion could be used with skins depicting a Canadian goose, a snow goose, and a white front or blue goose. This permits a hunter who is hunting Canadian geese and who sees snow geese to easily replace the Canadian goose skin on the body portion with a snow goose skin, thus eliminating the need to have separate decoys for each species being hunted.

To accommodate the legs 18 joined to the body portion 10, the skin 24 may be shaped to fit around the legs. Alternatively, the skin 24 may have two openings (not shown) for allowing the free ends of the legs 18 to pass through the skin and into the slots 20.

As shown in FIG. 6, the skin 24 fits over a stub column 40 used to mate the head portion 12 to the body portion 10. If desired, this portion of the skin may have an aperture 42 which allows a portion of the stub column 40 to extend through the skin and the skin 24 to more tautly conform to the shape of the stub column 40 and thus create a more life-like figure.

As previously mentioned, the head portion 12 is also covered by a skin 26. This skin is also formed from a fabric material having a photograph printed thereon. Here again, a stretch fabric is a preferred skin material. obviously, the photograph printed on the skin 26 conforms to the animal species which the figure is to represent. As shown in FIG. 7, the skin 26 has an open end 44 which allows the skin 26 to be placed over the head portion 12. The open end however is defined by a border having an elastic material (not shown) therein which allows the open end to close around a post 46 which protrudes from the lower end of the head portion 12. The post 46 is sized to fit within an opening 48 in the stub column 40 and thus join the head portion 12 to the body portion 10.

While the animal figure has been described as having a separate head and body portion, it should be recognized that it is possible to have an animal figure that has integral head and body portions. In such instances, the skins 24 and 26 would be replaced by a single skin which fits over the head and body portions of the animal figure.

To assemble an animal figure in accordance with the present invention, the feet 16 and the legs 18 are first joined to the body portion 12 by inserting the free ends of the legs 18 into the slots 20. The frame 22 is then joined to the feet 16 by screwing the frame to the bottoms of the feet. Thereafter, the skin 24 is placed over the body portion 24. The skin 24 is then secured in place, such as by the snap connectors 36 and 38. The head portion 12 is joined to the body portion 10 by inserting the post 46 into the opening 48 in the stub column 40. Prior to mating the head portion 12 to the body portion 10, the skin 26 is placed over the head portion 12.

As previously discussed, the animal figures of the present invention have particular utility as hunting decoys. They can however be used as lawn ornaments, theatrical props, crop protection devices and museum display pieces. The animal figures may be easily assembled and disassembled for transport and storage. Still further, one can use the head and body portions of the animal figures of the present invention with a number of different skin coverings, thus eliminating the need to have different animal figures for different species.

Figure 8:
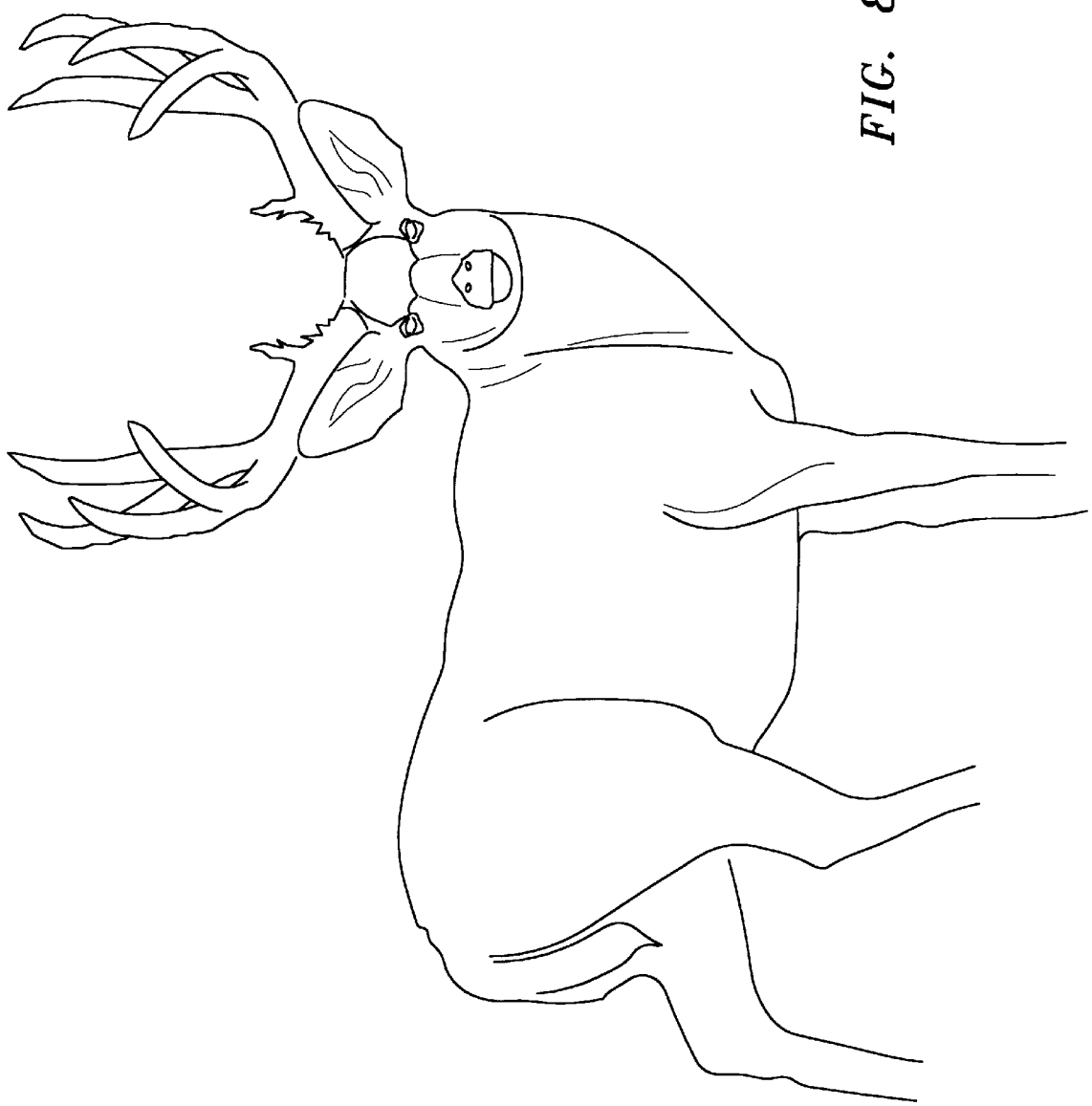
FIG. 8 shows an animal figure in accordance with the present invention in the form of a deer.

While the present invention has been described in the context of an animal figure in the form of a bird, it should be recognized that the animal figure could be in the form of another type of animal such as a deer. FIG. 8 illustrates an animal figure in the form of a deer having a skin formed from fabric material having a photograph of a deer printed thereon.

While the animal figures shown in the drawings have legs and feet attached thereto, it is possible to use the bird-like figures without any legs or feet. In other words, it is possible to use them merely by resting the body portion on the ground.

While the animal figures have been described in connection with usage on land, it is also possible to use certain ones on water. For example, bird-like animal figures could be made with a body portion formed from a buoyant, rigid foam material and a skin covering that has a waterproof lining or coating applied thereto. When used in a water environment, the legs, feet and supporting frame need not be connected to the body portion.

It is apparent that there has been provided in accordance with the present invention an animal figure which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An animal figure for use as a hunting decoy comprising:
   a three-dimensional body in the shape of an animal, said body including a head portion and a body portion;
   a removable skin formed from a fabric material placed over said body portion and said head portion, said fabric material having a two-dimensional photograph of head, body and tail portions of the animal printed thereon;
   means for securing said removable skin about said body;
   said body portion including a stub column, said stub column having an opening; and
   said head portion having a post adjacent a lower end, said post fitting into said stub column opening.

2. The animal figure of claim 1 wherein said skin is formed from a stretch fabric material having said photograph of said animal screen printed thereon.

3. The skin of claim 2 wherein said stretch fabric material comprises a polyester material.

4. The animal figure of claim 1 wherein said body portion includes a tail portion shaped to depict the tail feathers of a bird.

5. The animal figure of claim 1 wherein said body is formed from a rigid foam material.

6. The animal figure of claim 1 wherein said body is formed by a hollow body.

7. The animal figure of claim 1 wherein said body is formed by an inflatable body.

8. The animal figure of claim 1 further comprising:
a plurality of feet secured to said body so that said decoy is free standing.

9. The animal figure of claim 8 further comprising:
said feet being secured to means for providing support for said decoy.

10. The animal figure of claim 9 wherein said support providing means comprises a frame dimensioned to be small enough that an animal would not notice same.

11. The animal figure of claim 10 further comprising:
each of said feet having grooves machined into a bottom surface;
portions of said frame being seated within said grooves; and
said frame being secured to said feet by screws.

12. The animal figure of claim 8 further comprising:
a pair of legs attached to said feet; and
means within said body for receiving free ends of said pair of legs.

13. The animal figure of claim 12 further comprising said skin surrounding said free ends of said pair of legs when said free ends of said pair of legs are secured to said body.

14. The animal figure of claim 1 wherein said body comprises a three-dimensional body in the shape of a bird.

15. The animal figure of claim 1 wherein said body comprises a three-dimensional body in the shape of a goose.

16. An animal decoy for use by hunters which comprises:
a three-dimensional body in the shape of an animal;
said body including a head portion and a body portion including a tail portion of said animal;
said head portion and said body portion each being formed from a rigid foam material;
said head portion having means for allowing said head portion to be removed from said body portion and for positioning said head portion with respect to said body portion;
a skin extending over each of said head portion and said body portion, said skins being formed from a fabric material having a two-dimensional photograph of head, body, and tail portions of said animal printed thereon; and
means for supporting said decoy in an upright position.

17. The animal decoy of claim 16 wherein said supporting means comprises a pair of feet secured to said body.

18. The animal decoy of claim 17 wherein said supporting means further comprises a frame attached to said pair of feet.

19. The animal decoy of claim 16 wherein said body has the shape of a bird.

20. The animal decoy of claim 16 wherein said body has the shape of a goose.

21. The animal decoy of claim 16 wherein said body has the shape of a deer.

22. The animal decoy of claim 16 wherein said fabric material has a central opening formed by two opposed edges and each of said edges having means for securing said skin over said body.

23. The animal decoy of claim 22 wherein said securing means comprises a fastening device along a first one of said edges and a mating fastening device along a second one of said edges.

24. The animal decoy of claim 22 wherein said securing means comprises at least one snap connector attached to each of said edges.

25. The animal decoy of claim 22 wherein said securing means comprises an elastic band arrangement incorporated within said edges for securing said material to said body.

26. The animal decoy of claim 16 wherein said means for allowing said head portion to be removed from said body portion and for positioning said head portion with respect to said body portion comprising a post protruding from a lower end of said head portion.

27. The animal decoy of claim 26 wherein said body portion includes a stub column having an opening and wherein said post is sized to fit within said opening.

28. An animal figure for use as a hunting decoy comprising:
a three-dimensional body in the shape of an animal, said body including a head portion and a body portion;
a removable skin formed from a fabric material placed over said body portion and said head portion, said fabric material having a two-dimensional photograph of head, body and tail portions of the animal printed thereon;
said skin including a first skin to be placed over said body portion, said first skin having an opening for allowing said first skin to be placed over said body portion;
said first skin having fastening devices along two opposed edges of said opening for securing said first skin to said body portion;
said removable skin including a second skin to be placed over said head portion; and
said second skin having an open end for allowing the second skin to be placed over said head portion.

29. The animal figure of claim 28 wherein said body comprises a three-dimensional body in the shape of a deer.

30. An animal decoy comprising:
a three-dimensional body in the shape of an animal having a body portion and a head portion;
said body portion and said head portion each being formed from a solid foam material;
said body portion having a stub column forming a portion of a neck of said animal and a tail portion shaped to depict the tail of said animal;
said head portion having a post adjacent a lower end, said post being sized to fit within an opening in said stub column;
a skin fitting over said head portion and said body portion;
said skin being formed by a fabric material having a two-dimensional photograph of head, body and tail portions of said animal printed thereon;
said skin having an opening located adjacent an underside of said body portion to allow said skin to be placed over said body portion and means for securing opposed edges of said skin opening together to stretch said skin over and secure said skin about said body portion;
a pair of feet for allowing said decoy to stand in an upright position;
the underside of said body portion having means for receiving said pair of feet; and
a frame attached to each of said feet for supporting said decoy in an upright position, said frame being sized so that an animal will not notice same.

* * * * *